United States Patent [19]

Madden et al.

[11] Patent Number: 5,650,599
[45] Date of Patent: Jul. 22, 1997

[54] NOISE CANCELLATION METHOD AND APPARATUS

[75] Inventors: Peter E. Madden, Shaker Heights; Basil Fedun, Chardon; Paul N. Turner, Concord Township; Michael P. Johnson, Shaker Heights, all of Ohio

[73] Assignee: Northrop Grumman Corporation, Los Angeles, Calif.

[21] Appl. No.: 439,055

[22] Filed: May 8, 1995

Related U.S. Application Data

[63] Continuation of Ser. No. 45,425, Apr. 13, 1993, abandoned.
[51] Int. Cl.⁶ .................................................. B64F 1/26
[52] U.S. Cl. ........................ 181/218; 181/224; 181/264; 181/268
[58] Field of Search ........................ 181/210, 213, 181/214, 217, 218, 224, 239, 250, 251, 255, 264, 268, 270, 273, 282

[56] References Cited

U.S. PATENT DOCUMENTS

| | | | |
|---|---|---|---|
| 3,033,307 | 5/1962 | Sanders et al. | 181/224 |
| 3,187,835 | 6/1965 | Smith | 181/210 |
| 4,122,912 | 10/1978 | Lepor | 181/218 |
| 4,287,962 | 9/1981 | Ingard et al. | 181/224 |

*Primary Examiner*—Khanh Dang
*Attorney, Agent, or Firm*—Walter G. Sutcliff

[57] ABSTRACT

A method and apparatus for reducing noise originating in a flowing stream of gases in which the noise is progressively absorbed from the flowing stream to provide noise of reduced intensity relative to noise intensity at the upstream end of the stream, and the noise of reduced intensity actively attenuated with controlled sound energy. To facilitate the active attenuation of noise, the flowing stream is preferably divided into a plurality of smaller streams after a level of reduced intensities is attained and the active attenuation performed independently in each of the smaller streams. The apparatus is in the nature of a conduit (10) which defines a single duct extending from the inlet end (14) for a portion of the length of the conduit. Downstream, the single duct joins with a plurality of ducts (32.34) extending to the outlet end (16). An active noise attenuating device is preferably provided in each of the plurality of ducts.

8 Claims, 4 Drawing Sheets

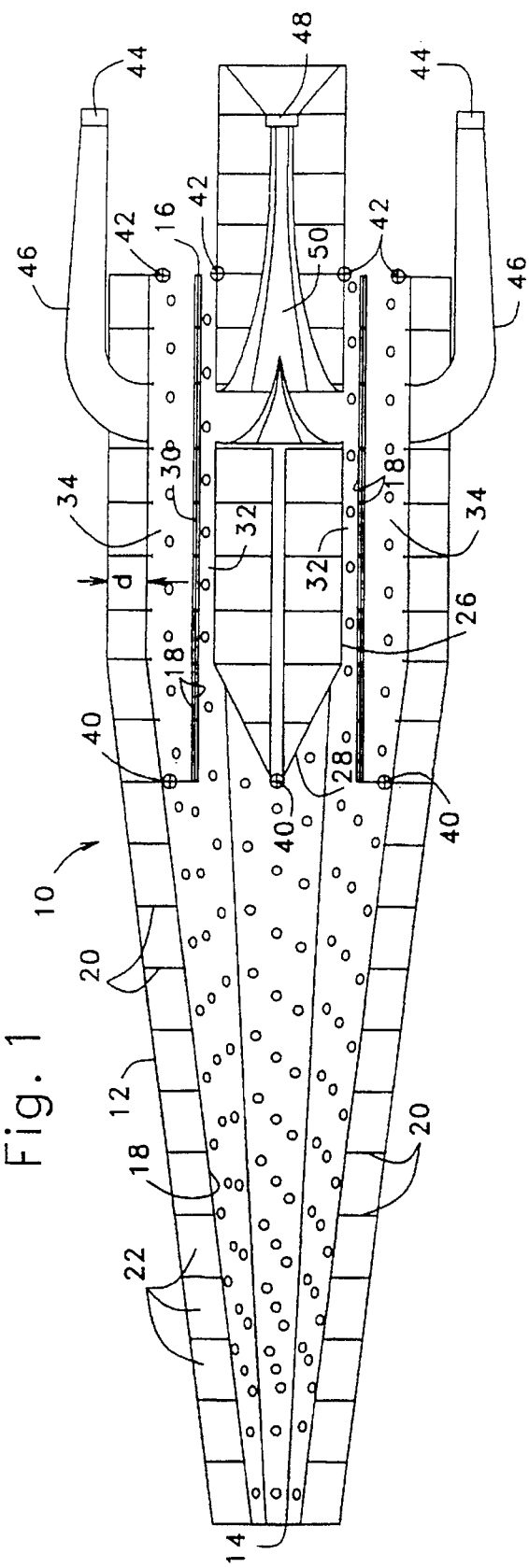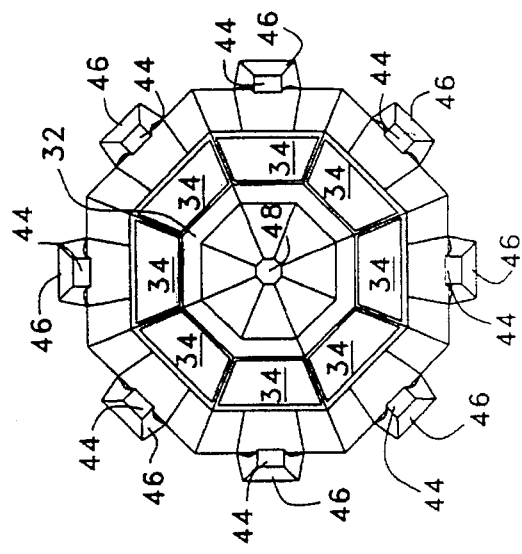

NOISE CANCELLATION METHOD AND APPARATUS

This application is a continuation of application Ser. No. 08/045,425 filed Apr. 13, 1993, now abandoned.

BACKGROUND OF THE INVENTION

The present invention relates to noise cancellation and, more particularly, it concerns a method and apparatus by which passive noise absorption and active noise attenuation with sound energy are combined to cancel noise in a flow of gases. Although the invention has a broad range of applications, it is particularly suited to cancellation of noise developed by jet engines, during ground testing, and will be described in that application.

Jet engines, particularly the older types which have a low air bypass, are extremely noisy devices and create an environmental problem. The noise, which originates mainly in the gas jet outside of the engine housing, is very difficult to control and meaningful solutions have not been found. A large amount of the energy is in the low frequency band (about 80 Hz) which is very difficult to attenuate. Sound at these frequencies can propagate for large distances if the atmospheric conditions are favorable and the intensity of these low frequencies is enough to rattle windows and plates in a range of up to a few miles.

Although some design modifications in Jet engines have produced noise reductions for aircraft during takeoff and landing, large radiated noise levels are still generated. This is particularly a problem during ground run-up testing when the engines may be running at full power for periods in excess of 30 minutes. For people working close to the plane, this can produce health problems such as hearing loss if proper precautions are not taken. For people living within the sound footprint of the jet noise, this can cause stress-related problems and affect property values. For the owners of the Jet testing facility, revenues could be reduced due to the restricted times when they are allowed to test the jet engines.

Considerable efforts are being made to quiet aircraft Jet engines during flight. Newer jet engine designs use a fan to blow colder air around the hot jet. Mixing occurs and produces a cooler, slower moving jet which radiates less noise, especially in the lower frequencies. The same principles are used in the design of "hush kits" which are retrofitted to existing noisy engines. Although the hush kits enable the planes to meet the in-flight requirements, the reductions are small and are not sufficient to eliminate the problem of ground run-up testing which requires quieting over and above that provided by the hush kits.

Currently, three approaches are being taken to minimize the effects of the noise generated by ground testing of jet engines. First, by choosing a time of day, a location, and an aircraft orientation for the engine testing, the annoyance to the surrounding community can be minimized. Sometimes, a man-made barrier is placed between the plane and a community to help reduce the noise propagation in a particular direction. Second, portable devices called "noise suppressors" are wheeled up to the back of the jet which exhausts into and through them. To aid in the noise reduction, the end of a pipe through which jet exhaust gases are passed, may be curved to direct non-absorbed acoustic energy towards the sky. The third approach is known as a "hush house," that is, a complete building with acoustically treated walls, intakes and exhausts. When the engines of an aircraft are to be tested, the aircraft is taken into the hush house and the doors are closed to completely contain the sound.

None of the present approaches to jet engine testing noise reduction meets a required combination of criteria, including good noise reduction, mobility and adaptability to different planes at different places on an airport, and affordability. To restrict testing to some period during the day, even with barriers constructed to shield some areas, results in no reduction of radiated energy; it is only redistributed. Moreover, under some environmental conditions, for example, when the ground is cooler than the air, more distant communities can experience high noise levels, particularly at the low frequencies.

Several schemes have been tried for noise suppressors. Generally, such systems rely on passive absorption to reduce the sound level, but the problem remains at the low frequencies which are difficult to attenuate. Where remaining sound is directed to the sky, some effectiveness occurs at high frequencies, but at low frequencies, the wavelength is comparable to, or greater than, the dimensions of the exit and good directivity is unobtainable. Another quieting method uses large amounts of water sprayed into the jet. Some reductions in the radiated noise take place, but the huge amounts of water needed make this impractical for most facilities.

The "hush house" is the one approach that does reduce the noise to completely acceptable levels. These purposely designed buildings, however, require much maintenance and repair to keep them in good working order. The cost of such buildings can be prohibitive for all but the most affluent airports.

It is apparent that the problems associated with noise generated during testing of aircraft jet engines represents a challenging need for effective noise cancelling technology. The technology is also needed in various types of machinery, such as gas and steam turbine generators, large compressors, gas operated tools and machines, pumps and the like, where noise is carried in a directional flow of gases.

SUMMARY OF THE INVENTION

In accordance with the present invention the problems associated with noise generated by machinery, such as aircraft jet engines, are substantially avoided by a method and apparatus having advantages and applications as will be set forth in part in the description which follows, and in part will be obvious from the description, or may be learned by practice of the invention. The purpose and advantages of the invention will be realized and attained by means of the elements and combinations particularly pointed out in the appended claims.

To achieve the advantages and in accordance with the purpose of the invention, as embodied and broadly described herein, the invention comprises a method for reducing noise originating at an upstream end of a flowing stream of gases, the method including the steps of progressively absorbing noise from the flowing stream to provide noise of reduced intensity relative to noise intensity at the upstream end of the stream, and actively attenuating the noise of reduced intensity with controlled sound energy. To facilitate the active attenuation of noise, the flowing stream is preferably divided into a plurality of smaller streams after a level of reduced intensities is attained and the active attenuation performed independently in each of the smaller streams.

In another aspect, the invention involves an apparatus for reducing noise in a flow of gases, the apparatus comprising an elongated conduit having an inlet end to receive the flow of gases at maximum noise intensity and an outlet end spaced from the inlet end by the length of the conduit.

Passive noise absorbing means extends from the inlet end within the conduit and for a substantial portion of the length thereof. Active noise attenuating means are located within the conduit downstream from the inlet end for attenuating with sound energy, noise of intensities reduced from the maximum noise intensity by the passive noise absorbing means.

In further aspects of the invention, the conduit of the apparatus defines a single duct extending from the inlet end for a portion of the length of the conduit. Downstream, the single duct joins with a plurality of ducts extending to the outlet end. An active noise attenuating device is preferably provided in each of the plurality of ducts. Also, each of the active noise attenuating devices includes a sound generator for producing noise cancelling sound energy upstream from the outlet end, a first microphone upstream from the sound generator, a second microphone downstream from the sound generator, and a control system responsive to sound at the first and second microphones for actuating the noise cancelling sound generator to account for noise transfer along the passive noise absorbing means between the first microphone and the noise cancelling sound generator.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate a representative embodiment of the invention and together with the description, serve to explain the principles of the invention. In the drawings, FIG. 1 is a largely schematic longitudinal cross section of a noise cancelling apparatus in accordance with the present invention, the longitudinal section being taken on line 1—1 of FIG. 2.

FIG. 2 is an end view as seen from the right side of FIG. 1;

DETAILED DESCRIPTION OF THE PREFERRED EMBODIMENT

Reference will now be made in detail to the present preferred embodiment of the invention, an example of which is illustrated in the accompanying drawings. Wherever possible, the same reference numbers will be used throughout the drawings to refer to the same or like parts.

In accordance with the present invention, an apparatus is provided by which noise at maximum intensity in a flow of gases is received at the inlet of an elongated conduit having passive noise-absorbing means extending for at least a substantial portion of the conduit length and by which the noise is reduced from its maximum intensity level by absorption. The conduit extends from its inlet end for a portion of its length preferably as a single duct and joins with a plurality of relatively small ducts near the outlet end of the conduit. Active noise attenuating means are included within the conduit at a position to be effective to substantially cancel noise that has been reduced in intensity by passage of the gas flow over a substantial portion of the passive noise absorbing means.

Figure 3:
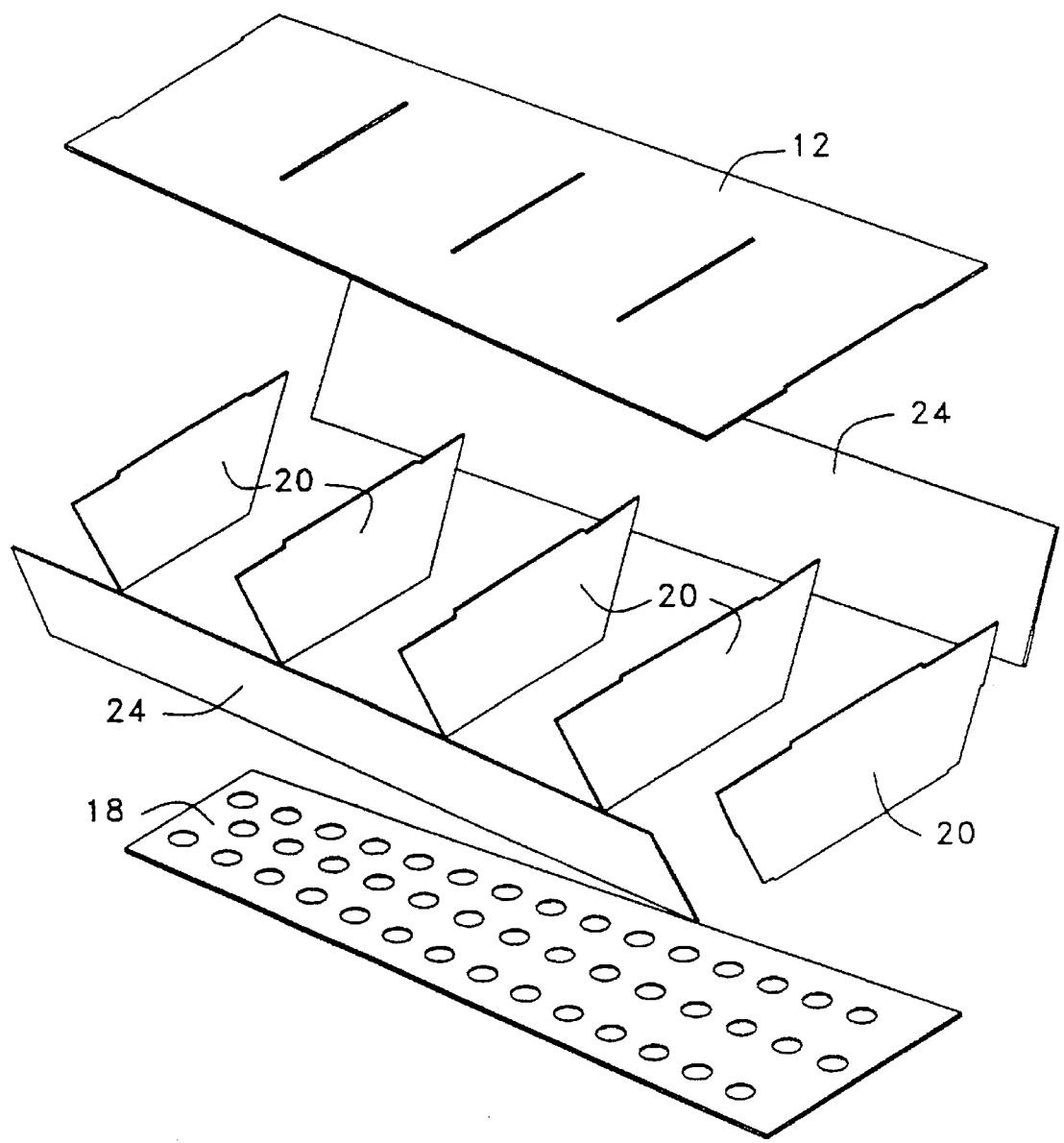
FIG. 3 is an exploded perspective view illustrating the construction of a single section of the apparatus shown in FIG. 1.

In FIGS. 1–3 of the drawings, an embodiment of a noise quieting device is shown. The device is generally designated by the reference numeral 10 and is particularly suitable for quieting the noise during ground testing of air craft jet engines. The device 10 is in the nature of an elongated conduit having a closed outer wall 12 extending throughout the length of the conduit from an inlet end 14 to an outlet end 16. As may be seen from the end view in FIG. 2, the device is generally octagonal in cross sectional configuration; however, it is contemplated that circular, rectangular or other cross sectional configurations may be used with a similar degree of effectiveness depending on the origin of sound to be cancelled. In the illustrated device 10, the outer wall 12 diverges from the inlet end 14 for a substantial portion of the overall length of the conduit. Between the end of the diverging portion and the outlet end 16, the outer wall assumes a relatively constant cross sectional dimension. The angle of divergence from the inlet end 14 is selected to complement the configuration of an expanding stream of gases emanating from the exhaust of a jet engine. The angle typically found in this environment is 7° from the axis of flow or a total wall divergence angle of 14°.

Spaced inwardly of the outer wall 12 is a lining of open dissipative layer sheet material 18 which, in the illustrated embodiment, is defined by apertured sheet steel. The dissipative sheet material is spaced from the outer conduit wall 12 of the device 10 by a distance (d) to be described in more detail below. The space between the lining sheet material 18 and the outer wall 12 is provided with a plurality of radial annular baffles 20 to establish cells 22 between the sheet material lining 18 and the outer wall 12.

In FIG. 3 of the drawings, an isolated section of components 12, 18 and 20 are shown in a manner to depict assembly of the conduit of the device 10. As shown, a panel of the outer wall 12 is assembled with a panel of the lining 18 and five of the baffles 20. Stringers 24 extend along the sides of the baffles 20 and provide resistance against bending along the length of each section. When assembled, the section depicted in FIG. 3 represents one of eight such sectors around the divergent portion of the device. These sections are secured by riveting, bolting, welding, or the like, and then secured to each other in like manner to provide the composite structure represented in FIGS. 1 and 2 of the drawings.

For approximately the length of the divergent portion of the device 10, the inner lining 18 defines a single passageway or duct extending from the inlet end 14. Near the end of the diverging portion, a central bullet-shaped structure 26 extends through the outlet end 16. The bullet structure 26 has a pointed end 28 directed upstream in relation to the flow of gases, and diverges in a downstream direction to a main body portion of uniform cross sectional dimension. Spaced outwardly from the body of the bullet-shaped structure 26 is a solid wall 30 covered on both sides with dissipative sheet material 18 spaced from the wall 30. This establishes a peripherally continuous or annular duct 32 extending from near the end of the divergent single duct to the outlet end 16. Outwardly of the wall 30 and dissipative sheet 18, a plurality of individual ducts 34, specifically eight ducts 34, extend from the end of the divergent single duct, aligned with the outer periphery thereof, to the outlet end 16. Thus, in the illustrated embodiment, an inner annular space 32 is circumscribed by an outer annular space divided into eight individual ducts 34 shown most clearly in FIG. 2.

The construction of the passive noise-absorbing means constituted by the dissipative inner lining 18, the baffles 20 and the cells 22 formed thereby extend throughout the length of the conduit of the device 10 although possibly modified in depth in the region beginning with the body of the bullet structure 26 to the outlet end 16. The characteristics of the passive noise-absorbing duct structure of the present invention are designed to optimize absorption of noise frequencies representing the high end energy in the noise source. For example, the depth (d) of spacing between the dissipative sheet material 18 and the outer wall 12 is selected as follows:

$$d = \frac{c}{1.54\pi f_o \eta_o}$$

In the equation, c is the speed of sound in air; $f_o$ is frequency of maximum attenuation; and $\eta_o$ is a parameter which varies with the diametric dimension of the conduit. To prevent propagation of sound in the airspace behind the dissipative lining material 18, the airspace is subdivided such that no individual cell 22 is longer than approximately $\lambda_o/4$, where $\lambda_o$ is the wavelength corresponding to the frequency $f_o$ of maximum attenuation.

Although the illustrated and described construction of passive noise-absorbing means is presently preferred, particularly for the jet engine noise cancelling application of the device 10, the passive noise-absorbing means may be embodied in other constructions. For example, passive noise-absorption may be achieved by a continuous blanket of dissipative material having a thickness comparable to the spacing (d). Another design contemplated is a dissipative blanket in the air gap behind a thin dissipative layer. It is to be understood, therefore, that with differing applications of the invention, the passive sound absorbing means may differ from that described above with reference to the drawings.

In accordance with the present invention, active noise attenuating means is provided downstream from the end of the single-duct section where the noise has been sufficiently reduced in intensity by passive absorption so that the remaining noise energy may be matched and cancelled by sound energy from an acoustic speaker, for example. The active noise attenuating section of the device is preferably coextensive with a downstream portion of the passive section so that reduced intensity noise is further attenuated and cancelled by a combination of passive absorption and speaker generated sound energy. The sound generators of the active noise attenuating means may be interconnected in a multi-input, multi-output (MIMO) control scheme or incorporated in separate single input single output (SISO) scheme.

In the embodiment illustrated in FIGS. 1 and 2, the active noise attenuating means is a SISO scheme, and as such, includes a separate active noise attenuating system for each of the ducts 30 and 34. Thus, nine separate active noise attenuating systems are provided in the illustrated embodiment. Each of these active noise attenuating means includes a reference microphone 40 at the upstream end of the active section, an error microphone 42 at the downstream end or at the outlet end 16 of the device 10, and a sound generator between the reference microphone 40 and the error microphone 42. In the illustrated embodiment, the sound generator for each of the ducts 34 includes a speaker 44 at the end of exponential horns 46 which open to the outer side of each of the ducts 34. The active sound generator for the inner annular duct is provided by a speaker 48 at the end of a centrally oriented exponential horn 50 by which sound waves generated by the speaker 48 are directed peripherally from the bullet structure 26 into the annular duct 32. The use of the exponential horns provides a measure of protection to the speakers 44 and 48 from the hostile environment of jet engine exhaust gases. In gas flow streams less likely to damage the speakers, it is contemplated that the speakers could be located in direct proximity to the respective ducts.

Figure 4:
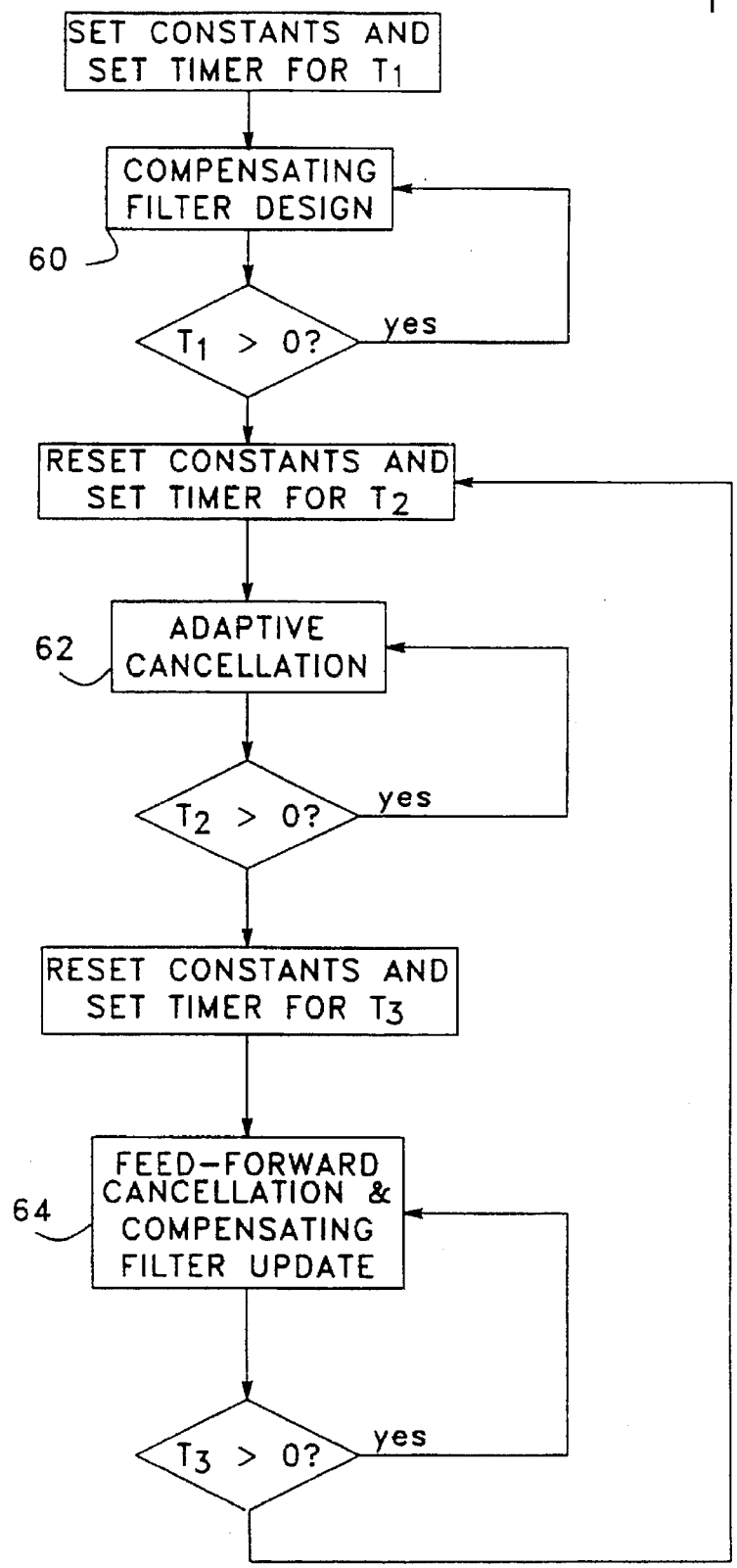
FIG. 4 is flow chart depicting the logic of the active noise attempting system of the invention.

The general operation of the active noise cancelling system is represented by flow chart in FIG. 4 of the drawings. As depicted in FIG. 4, three operating sequences are represented by blocks 60, 62 and 64. While a detailed description of the sequence of operation performed during each of the compensating filter design 60, adaptive cancellation 62 and feed-forward cancellation and compensating filter update 64 will be provided below, it will be noted from FIG. 4 that each of these operations is a timed sequence in which the compensating filter design operation is conducted for so long as a time T1 is unexpired, whereas the time increments T2 and T3 are similarly provided for the adaptive cancellation, feed-forward cancellation and compensating filter update.

In the detailed processing operations to follow, the steps for each of the major sequences 60, 62 and 64 will be provided under subtitles corresponding to the legends which appear in FIG. 4.

COMPENSATING FILTER DESIGN 1.1 Set C=0, B1≠0, A≠0, B2≠0

1.2 Sample and store Reference Microphone (ADC1) and Error Microphone (ADC2) outputs.

1.3 Generate Random Number and store in buffer.

$$RN_i(n)=[(RN_i(n-1))+C]\text{Mod m}$$

Where: $RN_i(n)$=Present Random Number Value for Channel i; $RN_i(n-1)$=Previous Random Number Value for Channel i; C=Constant; Mod=Modulus Operator; and m=$2^{32}$ 1.4 Scale Random Number $RN_i(n)$, convert to a voltage level (DAC) and apply to a speaker.

$$A_i(t)=(A \times RN_i(n))*DAC$$

Where: *DAC is a Digital-to-Analog Conversion Process; $RN_i(n)$=Random Noise Value; A=Constant; and $A_i(t)$= Cancelling Signal for Speaker "i"

1.5 Compute response of compensating filter FIR_RC(i) to Random Number Sequence.

$$RC_i(n) = \sum_{k=0}^{M-1} RC_{ki}(n-1) \times RN_i(n-k)$$

Where: $RC_i(n)$=Computed Response of FIR_RC(i) to $RN_i$ Sequence; $RC_{ki}(n-1)$=Previous $k^{th}$ Filter Coefficient for Channel i; and $RN_i(n-k)$=Random Noise Sample Computed k Samples Ago.

1.6 Compute Servo Error for FIR_RC(i).

$$D_i(n)=RC_i(n)-X_i(n)$$

Where: i=reference Microphone Number, for MIMO System i=1; $X_i(n)$=Sampled Value of Reference Microphone Output; and $RC_i(n)$=Computed Response of FIR_RC(i) to $RN_i$ Sequence 1.7 Update coefficients of FIR_RC(i).

$$RC_{ki}(n)=RC_{ki}(n-1)+(B2 \times D_i(n) \times RN_i(n-k))$$

Where: $RC_{ki}(n)$=Present $k^{th}$ Filter Coefficient for FIR_RC (i); i=Cancelling Speaker Number; $RC_{ki}(n-1)$=Previous $k^{th}$ Filter Coefficient for Channel i; B2=Constant; $D_i(n)$=Servo Error for FIR_RC(i)

1.8 Compute response of FIR_sa(ii) to Random Number Sequence.

$$Y_{ji}(n) = \sum_{k=0}^{M-1} H_{kj}(n-1) \times RN_i(n-k)$$

Where: J=Error Microphone Number; $Y_{ji}(n)$=Filter Output for Channel i; $H_{kj}(n-1)$=Previous $k_{th}$ Filter Coefficient for FIR_sa(ji); $RN_i(n-k)$=Random Noise Sample Computed k Samples Ago; and M=Number of Filter Coefficients.

1.9 Compute Servo Error for FIR_sa(ii).

$$E_{ji}(n)=Y_{ji}(n)-R_j(n)$$

Where: i=Channel Number; j=Error Microphone Number; $E_{ji}(n)$=Servo Error for FIR_sa(ji); $Y_{ji}(n)$=Response of FIR_sa(ji) to Random Noise Sequence; and $R_j(n)$=Present Sampled Value of $j^{th}$ Error Microphone.

1.10 Update Coefficients for FIR_sa(ii).

$$H_{kj}(n)=H_{kj}(n-1)+(B1 \times E_{ji}(n) \times RN_i(n-k))$$

Where: j=Error Microphone Number; k=Filter Coefficient Number; $H_{kj}(n)$=Present $k^{th}$ Filter Coefficient for Channel i; $h_{kj}(n-1)$=Previous $k^{th}$ Filter Coefficient for Channel i; B1=Constant; $E_{ji}(n)$=Servo Error for FIR_sa(ji); and $RN_i(n-k)$=Random Number Computed k Sample Periods Ago.

1.11 Check timer, if >0 go to 1.2, otherwise go to 2.1.

ADAPTIVE CANCELLATION 2.1 Set C≠0, B1=0, A=0, B2=0
2.2 Sample and store Reference Microphone (ADC1) and Error Microphone (ADC2) outputs.
2.3 Compute response of FIR_RC(i) to $V_i(n)$ sequence $$RC(n) = \sum_{k=0}^{M-1} RC_{ki}(n) \times V_i(n-k-1)$$

Where: RC(n)=Present Value of Reference Compensation for Channel i; $V_i(n-k-1)$=Cancelling Signal Value of $i^{th}$ Speaker Computed k+1 Samples Ago; and $RC_{ki}(n)$=$k^{th}$ Coefficient for Filter FIR_RC(i).

2.4 Compensate Reference Microphone sample and store.

$$CX_i(n)=X_i(n)-RC(n)$$

Where: $CX_i(n)$=Present Value of Compensated Reference for Channel i; $X_i(n)$=Present Sample of Reference Microphone Signal for Channel i; and RC(n)=Present Value of Reference Compensation for Channel i.

2.5 Compute Speaker Signal.

$$V_i(n) = \sum_{k=0}^{M-1} G_{ki}(n-1) \times CX_i(n-k) + \sum_{k=0}^{M-1} G_{koi}(n-1) \times CX_i(n-k)$$

Where: $V_i(n)$=Cancelling Signal Value for Speaker i; k=Filter Coefficient Number, 0–(M–1); $G_{ki}(n-1)$=Previous $k^{th}$ Filter Coefficient of FIR_a(i); $CX_i(n-k)$=Compensated Reference Sample from k Samples Ago; M=Number of Filter Coefficients; and $G_{koi}(n-1)$=(Initialized) $k^{th}$ Filter Coefficient of FIR_0(i).

2.6 Convert (DAC) Speaker Signal and apply to Speaker i.

$$A_i(t)=V_i(n)*DAC$$

Where: *DAC is a Digital-to-Analog Conversion Process; $V_i(n)$=Cancelling Signal Value for Speaker "i"; and $A_i(t)$=Cancelling Signal for Speaker "i".

2.7 Compute response of FIR_sa(ii) to compensated Reference Microphone sequence.

$$FR_{ji}(n) = \sum_{k=0}^{M-2} H_{kj}(n-1) \times CX_i(n-k)$$

Where: j=Error Microphone Number, 1 to L; $H_{kj}(n-1)$=Previous $k^{th}$ Filter Coefficient for Channel i associated with FIR_sa(ji); $CX_i(n-k)$=Compensated Reference for Channel i Computed k Samples Ago; M=Number of Filter Coefficients; and $FR_{ji}(n)$=Response of FIR_sa(ji) to Compensated Reference Sequence.

2.8 Update Coefficients of FIR_a(i).

$$G_{ki}(n) = G_{ki}(n-1) + C \sum_{j=1}^{L} R_j(n) \times FR_{ji}(n-k)$$

Where: k=Filter Coefficient Number, 0–(M–i); i=Channel Number; $G_{ki}(n)$=Present $k^{th}$ Filter Coefficient for Channel i; $G_{ki}(n-1)$=Previous $k^{th}$ Filter Coefficient for Channel i; C=Constant; $R_j(n)$=Present Sampled Value of $j^{th}$ Error Microphone; and $FR_{ji}(n-k)$=Filter Reference Output Taken k Samples Ago; L=Total Number of Error Microphones (for SISO System L=1).

2.9 Check timer, if >0 go to 2.2, otherwise go to 3.1.

Feed-Forward Cancellation and Compensating Filter Update 3.1 Set: B2≠0, C=0, B1≠0, A≠0.
3.2 Repeat steps 2.2, 2.3, 2.4 and 2.5.
3.3 Repeat steps 1.2 and 1.3.
3.4 Compute feed forward cancelling signal, convert to a voltage level and apply to speaker $$FF_i(n)=[V_i(n)+A \times RN_i(n)]*DAC$$

Where: $FF_i(n)$=feed forward cancelling signal for the speaker i; A=constant; $RN_i(n)$=random noise value; *DAC is a Digital-to-Analog conversion process.

3.5 Repeat steps 1.8, 1.9, 1.10, 1.5, 1.6 and 1.7.
3.6 Check timer, if >0 go to 3.2, otherwise go to 2.1.

It will be noted that in the repeating of steps 2.2, 2.3, 2.4, and 2.5 (i.e. step 3.2), the Feed-Forward Cancellation and Filter Update sequence does not update any of the FIR_a(i) filters. This "freezing" of the filter FIR_a(i) update during the time $T_3$ contributes to stability and better noise reduction of the active noise attenuating system of the invention. However, the alternating of adaptive cancellation and feed forward cancellation ensures that the system accounts for variations in the duct transfer functions due to temperature, gas content, velocity and the like.

Figure 5:
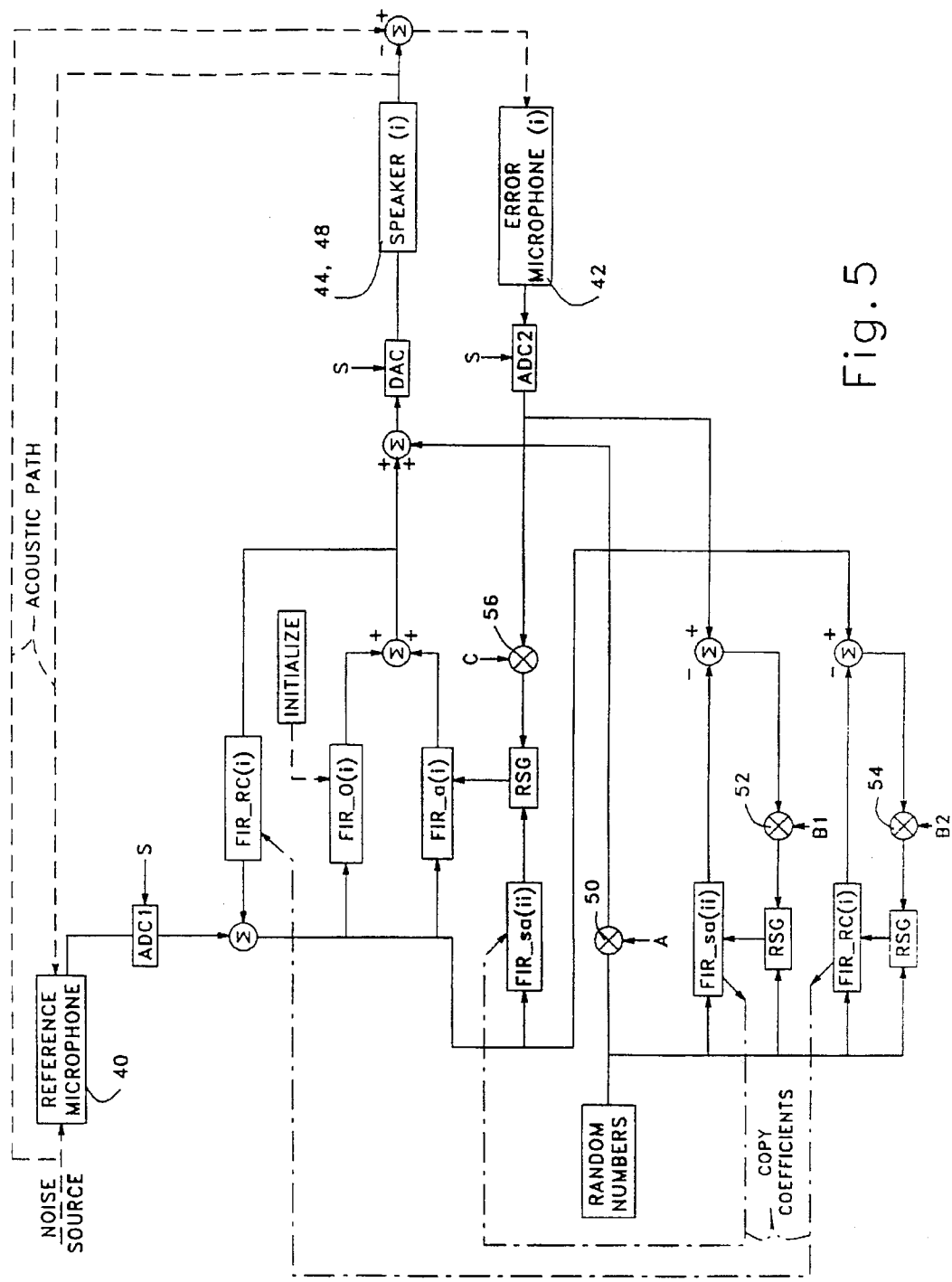
FIG. 5 is a block diagram of the active noise attenuating system of the present invention.

The control system for the active noise cancelling system for each of the ducts 32 and 34 is represented in FIG. 5 of the drawings. Essentially, the sound energy generated by each speaker 44, 48 is controlled by a computer (not shown) equipped with software providing a finite impulse response digital filter system and to which four constants A, B1, B2, and C are input to multipliers 50, 52, 54 and 56, respectively. Individual filters are designated in FIG. 5 as FIR_RC, FIR_0, FIR_a, and FIR_sa. The reference microphone signal is converted by an analog-to-digital converter ADC1, whereas the error microphone signal is converted to a digital format by a similar converter ADC2. The output of the filter system is fed to the speakers 44, 48 by digital-to-analog converter DAC.

The control system configuration is such that by manipulating the pseudo constants A, B1, B2, and C, different operating sequences can be achieved; that is, Compensating Filter Design, Adaptive Cancellation, and Feed-Forward Cancellation with Compensating Filter Update. Because the control system represented in FIG. 5 is a digital control system, with the exception of analog-to-digital converters (ADC1, ADC2), the digital-to-analog converter (DAC), the speaker, and the microphones, all of the remaining blocks represent different software algorithms or digital signal processing operations.

Noise reduction is achieved during the Adaptive Cancellation and the Feed-Forward Cancellation with Compensating Filter Update sequences. The sound energy generated by each speaker 44, 48 is controlled by the filters FIR_a(i) and FIR_0(i). The filters FIR_a(i) and FIR_0(i), therefore, operate as noise cancelling sound control devices. The algorithm represented by these filters is defined precisely in step 2.5 of the Adaptive Cancellation sequence. The coefficients for the FIR_a(i) are updated during adaptive noise cancellation using an algorithm labelled in FIG. 5 as RSG. The RSG algorithm is defined in step 2.8 of the Adaptive Cancellation sequence and its use represents a feed-back control mode.

The filter FIR_0(i) is a noise cancelling control device provided to initiate a noise reduction operation based on prior experience. The coefficients for the filter FIR_0(i) are not adjusted; they are supplied with the algorithm and represent the best estimate of what the filter ought to be at the beginning of a particular noise reduction session.

FIG. 5 also shows Finite Impulse Response filters FIR_RC(i) and FIR_sa(i). These filters are necessary to assure stable system operation and high noise reduction during the Adaptive Cancellation sequence and serve as stabilizing devices. The coefficients for filters FIR_sa(i) and FIR_RC(i) are determined during the Compensating Filter Design sequence. The coefficients for the filters FIR_sa(i) and FIR_RC(i) are updated during the Feed-forward Cancellation and Compensating Filter Update sequence while the filter FIR_a(i) is fixed or "frozen" as mentioned above.

In operation of the system depicted in FIG. 5, a signal from the reference microphone 40 is passed through the analog-to-digital converter ADC1, and through the sound control filter FIR_a(i). This filter modifies the reference signal such that when it is fed to the speaker 44, 48 the resulting sound is added to the acoustic noise traveling via the acoustic path. The result is sound cancellation to a degree determined by the output of the error microphone 42. The other components of the diagram ensure that the system converges and the sound level is reduced.

The finite impulse response filters are changed or adapted by algorithm to provide noise cancelling sound and to ensure system stability. FIR_a(i) is the fundamental control device for providing the noise cancelling sound signal. The starting values of this filter are stored in the filter FIR_0 which represents the best estimate based on previous sound cancelling runs. At start up, the FIR_0 values are downloaded into FIR_a(i) and the process begins. The values of the coefficients for FIR_a(i) are updated by algorithm in a direction or manner to minimize the output of the error microphone 42.

System stability is important to effective noise reduction using controlled sound energy. System instability causes the output from the error microphone to increase so that more noise is produced by the speakers than a system with no active control. There are two ways for this to happen. First, the transfer function through the speaker becomes negative, i.e. an inverted phase condition, and the filter coefficients are given the wrong sign, causing the signal strength to grow instead of diminish. This is corrected by FIR_sa(ii) in the system of FIG. 5. Secondly, the speaker can feed back to the reference microphone 40 and if the phase and amplitude are appropriate, the signal level can increase. To compensate for this, the filter FIR_RC(i) is included in the system. Thus, FIR_sa(ii) and FIR_RC(i) are stabilizing filters. For some applications, it is possible to determine the coefficients of the stabilizing filters at the start of the run and keep them fixed. This is not the case if the transfer functions change as occurs in a jet exhaust stream where temperature and other variables require the filters to be updated.

From the foregoing, several advantages of the present invention will be apparent. For example, the device 10 integrates passive and active noise control to produce a complete noise quieting system for jet engine noise. Both the high frequencies and the difficult and troublesome low frequencies are controlled. The passive features reduce the high frequencies but also low frequencies which makes the active noise cancellation possible.

The cone angle of about 7 degrees matches the rate at which the jet would grow naturally and therefore produces a minimal effect on the jet itself.

Passive attenuation is achieved through the use of a thin dissipative layer with an airspace behind it. The specific flow resistance $R_f$ of the dissipative layer and the depth d of the airspace are chosen to give values of the resistive and reactive components of the normalized acoustic impedance of this layer that are optimized for the frequency at which maximum acoustic attenuation is desired. This frequency is chosen to reduce the low frequency energy to make the active control functions easier at the end of the cone. Baffles are added to the inside of the cone to prevent sound from traveling along ducts formed between the outer skin and the absorbing material.

The bullet feature provides improved passive attenuation at the higher frequencies for sound waves near the center of the cone which are not effectively attenuated by the absorber on the cone walls. To do this it is covered with an air-backed absorbing layer designed to be most effective at a frequency above that of the active control bandwidth. In addition, it provides a housing for some of the acoustic projectors for cancelling the lower frequencies as part of the active control scheme.

Ducts constructed at the exit of the single-duct conical section or cone divide and configure the noise field so that the channels are independent. This enables a simpler active control scheme to be used. The ducts have a liner with a similar configuration to the inside of the cone except that the frequency of maximum attenuation is above that of the cone layer.

Even with the passive absorber, a large amount of low frequency power remains to be reduced by the active control section. A normal speaker configuration is very inefficient at low frequencies and a large number would be required which would be difficult to package in the space available. The invention uses single speakers at the end of horns to get a better match of impedances and obtain more radiated power. This permits a much reduced number of speakers to be used.

The condition required for good active control in a global sense is that the radiation pattern from the canceller is the same as that of the noise source. In the present embodiment, this requirement is met by injecting cancelling noise energy into a duct which also carries the unwanted noise. The duct geometry forces the cancelling energy to be partitioned into the same modes of propagation as the unwanted noise and provides a common radiating aperture to ensure global cancelling. The injection point itself is approximately a half wavelength from either end of the duct at the lowest frequency of operation.

The exit from the cone is divided so that it conforms to a series of one-dimensional ducts. Microphones are placed at the entrance of these ducts and can be used separately or as a weighted sum, to provide the reference for the controller. Microphones are placed at the duct exits and pick up the error signal to be nulled or driven to a predetermined value by the control system.

The control scheme for the active system updates the FIR filter coefficients in rotation to account for changes in the transfer functions due to changes in temperature, gas content, and the like. By updating all of the filters (i.e. the coefficients) in rotation, higher performance levels are possible than with previous approaches which either 1) updated all of the filters continuously, or 2) did not update the coefficients of filters FIR_RC(i) or the equivalent of these filters. The device of the present invention is designed to address the problem of noise being generated by the gas flow itself. However, there are a large number of cases where the noise is generated within machinery and exited through an orifice so that a gas flow is not the major source of noise. This latter case is a lesser problem than the problem associated with jet engines and such machinery will be effectively controlled by the present invention. Turbine generators and smokestacks are examples of noise sources that can be so controlled. In addition, large compressors, machine tools and pumps all produce large amounts of radiated noise which can be controlled using the integrated application of active and passive control of the present invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

We claim:

1. Apparatus for attenuating noise in a high velocity stream of gases having a natural expansion rate, such noise having low frequencies of high energy and ranging to higher frequencies, said apparatus comprising:

an elongated conduit having an outer wall, an inlet end to receive the stream of gases at maximum noise intensity and an outlet end spaced from said inlet end by the length of the conduit, the conduit having a first longitudinal section extending from the inlet end to a second longitudinal section ending at the outlet end, said first longitudinal section diverging continuously from said inlet end at an angle of divergence matching the natural expansion rate of the stream of gases; and an inner lining of perforated sheet material spaced uniformly from said outer wall at a substantially constant first distance and defining a single, peripherally closed, and unobstructed passageway throughout the first longitudinal section, the first distance being selected for maximum attenuation of the low noise frequencies of high energy.

2. The apparatus recited in claim 1 wherein said inner lining of perforated sheet material comprises apertured sheet steel.

3. The apparatus recited in claim 1 comprising means defining a plurality of cells along the length of at least the first longitudinal section between said perforated sheet material and said outer wall.

4. The apparatus recited in claim 3 wherein said cell defining means comprises radial baffles spaced along the length of the conduit.

5. The apparatus recited in claim 4 wherein the spacing between said baffles is approximately one fourth the wavelength of a noise frequency of maximum attenuation.

6. The apparatus recited in claim 1 wherein the first distance (d) of spacing between the perforated sheet material and the outer wall is:

$$d = \frac{c}{1.54\pi f_o \eta_o}$$

where c is the speed of sound in air; $f_o$ is frequency of maximum attenuation; and $\eta_o$ is a parameter which varies with the diametric dimension of the conduit.

7. The apparatus of claim 1 which further includes:

a central bullet structure in said second longitudinal section to establish an annular space throughout the length thereof, said annular space being divided into a plurality of longitudinal ducts, each of said plurality of longitudinal ducts having at least one solid wall and a duct lining of perforated sheet material spaced from the at least one solid wall by another distance less than said first distance for attenuation of the higher noise frequencies.

8. The apparatus recited in claim 7 wherein said plurality of longitudinal ducts extend in an inner annular passageway and in an outer annular passageway, the inner annular passageway being defined in part by the central bullet structure, and the outer annular passageway being aligned with the outer periphery on the downstream end of the single unobstructed passageway.

* * * * *